Nov. 3, 1925.
A. H. F. PERL ET AL
1,560,397
HAND OPERATED CUTTING AND/OR GRIPPING DEVICE
Filed May 29, 1922   2 Sheets-Sheet 1
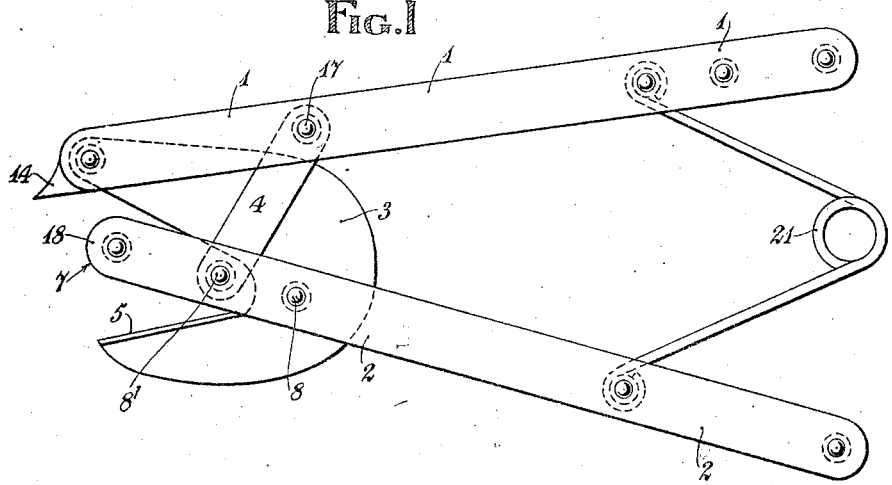
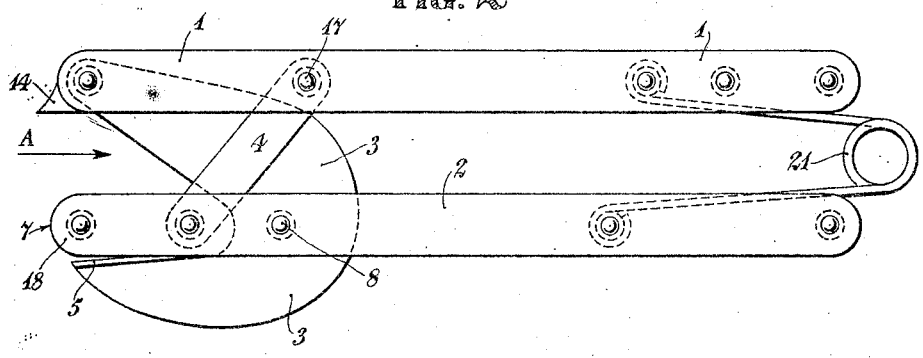
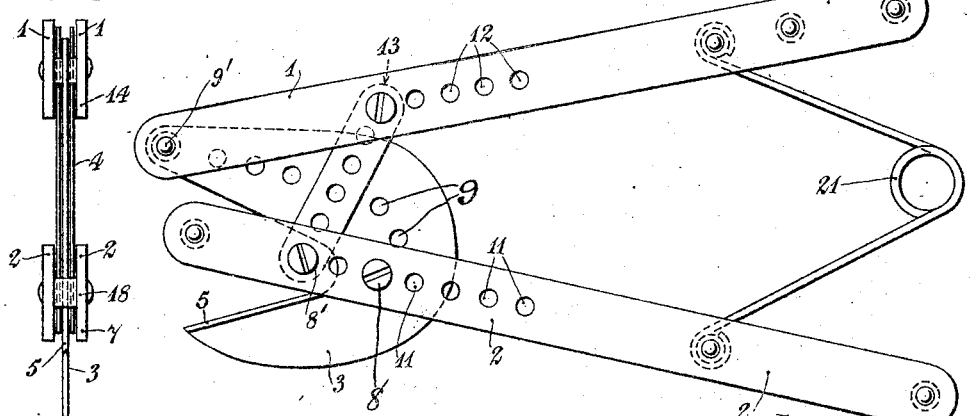
Inventors
A. H. F. Perl
R. H. Carter
by
Att'y

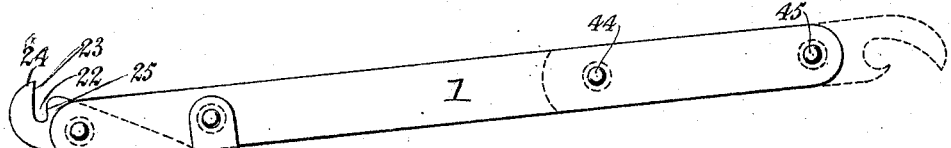
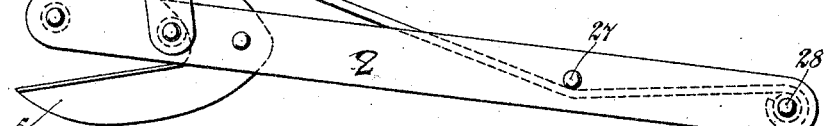
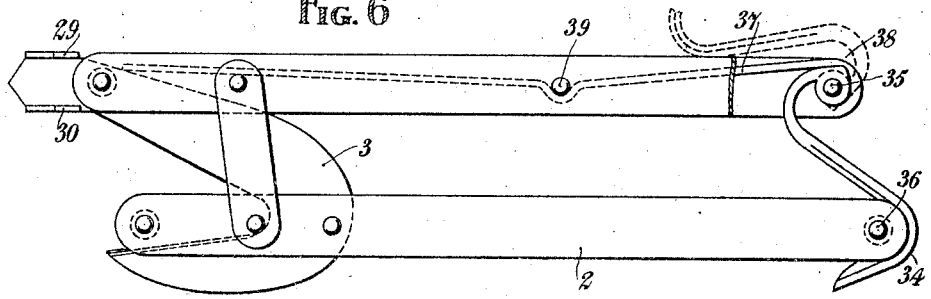

Patented Nov. 3, 1925.

1,560,397

UNITED STATES PATENT OFFICE.

ALBERT HENRY FRANKS PERL AND RICHARD HEMMINGS CARTER, OF LADBROKE GROVE, ENGLAND.

HAND-OPERATED CUTTING AND/OR GRIPPING DEVICE.

Application filed May 29, 1922. Serial No. 564,587.

*To all whom it may concern:*

Be it known that we, ALBERT HENRY FRANKS PERL and RICHARD HEMMINGS CARTER, subjects of His Majesty the King of England, and residents of Ladbroke Grove, in the county of London, Kingdom of England, have invented certain new and useful Improvements in or Relating to Hand-Operated Cutting and/or Gripping Devices, of which the following is a specification.

This invention relates to hand-operated cutting and/or gripping devices and has for its object to provide an improved hand-operated device, more especially intended for use in opening tin and like containers.

According to the present invention the device comprises two levers either of which may be an operating lever, which levers are pivotally interconnected by angularly disposed links one of which forms an offset pivotally connected to the aforesaid levers, the said offset link being provided with a cutting or gripping edge which is adapted to co-operate with the adjacent lever so as to effect cutting or gripping, the arrangement of the parts being such as to give an increased leverage as compared to a pair of scissors or pliers having the same overall length and the same length of cutting or gripping jaw as the aforesaid cutting or gripping device. The construction and arrangement is such that when the device is operated to effect cutting or gripping, the two operating levers diverge at the cutting or gripping end from each other to effect cutting and/or gripping, the return or inoperative movement of the operating levers being effected by means of a spring.

In order that the invention may be clearly understood reference is made to the accompanying drawings, which show by way of example constructions in accordance with the present invention; but we do not limit ourselves to the precise constructions hereinafter described and illustrated in the accompanying drawings.

Figure 1 is a plan of the device showing the operating levers in the inoperative or quiescent position;

Fig. 2 is a plan of the device showing the operating lever in the cutting position;

Fig. 3, drawn to an enlarged scale, is an end view of the device looking in the direction of the arrow A, Fig. 2;

Figs. 4, 5, and 6 are plans of modified forms hereinafter described;

Fig. 7 is a plan view of part of the device as adapted for gripping purposes;

Fig. 8 shows a modified form wherein the device is formed of doubled over metal; and Figs. 9, 10, and 11 show modified constructional forms of piercing devices.

Referring to the drawing the device comprises two operating levers 1 and 2 pivotally interconnected by angularly disposed links 3 and 4. One of the links 3, i. e., the outer link, which forms a pivoted offset from the lever 1 is extended to form a cutting jaw having a cutting edge 5, the said jaw extending forwardly of the device and outwardly of the end of the adjacent lever. The link 3 carrying the extended portion which acts as a cutting jaw thus forms a bell-crank lever. The end of the adjacent lever 2 which co-operates with the cutting jaw of the bell-crank lever is provided with a suitable projection 7 or projections so as to act as a fulcrum or fulcrums and/or a guide when operating the device to effect cutting. The bell-crank lever 3 is pivotally connected at 8 to the co-operating cutting and/or gripping lever 2, the other link 4 being pivotally connected to the lever 2 at a point 8′ forward of the pivotal connection 8 of the bell-crank lever to the lever 2.

The bell-crank lever 3 may be provided with a plurality of holes 9 and the pivotal pins 8 and 9′ connecting the said bell-crank lever 3 to the adjacent levers 2 and 1 may be removable from their holes and may be inserted in other holes 9 so as to provide for adjustment of the said bell-crank lever 3 relatively to the cutting and/or gripping lever 2. Holes 11 and 12 may also be provided in either the lever 1 or 2, or both levers 1 and 2, for adjustment purposes.

If so desired, the lever 1, Fig. 4, which carries the bell-crank lever, may be provided with a number of holes 12 so that the end 13 of the interconnecting link 4 may be adjusted to any desired position within the range of the holes disposed along any desired length of the non-cutting and/or gripping lever. The lever 1 may be provided with a suitable projection 14 to facilitate the entry of the point of the cutting jaw into a tin or like container so as to initiate the cutting operation. In the construction shown in Figs. 1 to 5, both inclusive, the operating levers 1, 2 are formed of duplicate metallic strips interconnected as by rivets or other suitable means as indicated at 18. The link 4 is also formed of duplicate strips through and between the strips of which the bell-crank lever passes, the strips of the link 4 being pivotally connected at their ends and to the levers 1, 2.

Fig. 5 shows a modified constructional form wherein the arm 3 of the bell-crank lever is provided at its end with a piercing device formed by an arcuate recess 22. The outer edge 23 of the arcuate recess ends in a point 24 and the inner edge 25 of the arcuate recess is somewhat rounded as shown. The device may thus be used to effect piercing of the lid of a tin or the body of the tin to allow of the subsequent insertion in the hole thus made of the cutting jaw 5. The two levers 1, 2 in this construction are maintained apart by a spring 26 which bears on the connecting arm of the bell-crank lever, the said spring being subsequently passed round or guided by a rivet 27 and thereafter coiled round the rivet 28.

In Fig. 6 which shows a modified form of piercing device and also a hook arrangement for retaining the levers 1, 2 in inoperative position, the piercing device, which is shown drawn to an enlarged scale in Fig. 9 comprises two curved projecting members 29 and 30 on the end of the bell-crank lever adapted to simultaneously bear with their pointed edges 31 and 32 on the lid of the tin or on the body thereof. The arm between the projections 29 and 30 is beveled off to form a sharp edge 33 which is adapted to be utilized as a piercing point. This piercing device, as shown in Fig. 6, is formed integral with the arm of the bell-crank lever; but it may be pointed out that the integral formation of the piercing device with the arm is not absolutely necessary. The two levers 1, 2 may be retained in the inoperative position by a hook 34 pivotally mounted as at 35 on the lever 1 and adapted to engage a rivet 36 on the lever 2. The hook is held in the retaining position by a spring wire 37 one end of which bears on a flat face 38 on the hook member, the other end of the spring wire bearing on the arm of the bell-crank lever. The spring wire 37 is bent round inside a rivet 39 as shown so that the said spring wire may be retained in position. The hook 34 when the device is in use occupies the position shown in dotted lines in Fig. 6. In this position the hook acts as a stop for the hand and also facilitates the forward feed of the cutting device as a whole.

When it is desired to use the implement as a gripping device such, for example, as gripping nuts or other polygonal bodies, the edge of the bell-crank lever which was previously formed as a cutting edge and the co-operating adjacent edge of the cutting and/or gripping lever may each be provided with a suitably shaped recess having plain or serrated edges as shown at 19, 20, Fig. 7, so as to engage the nut or other polygonal body for gripping purposes. If desired a plurality of such recesses may be used so as to fit different sized objects. In all the constructions, the operating levers are actuated against the action of a spring 21 which is connected at its ends to the respective operating levers.

If desired, the cutting and/or gripping lever 2 and also the non-cutting and/or gripping lever 1 may be formed from a sheet-metal blank doubled on itself as shown in Fig. 8, and the interconnecting link 4 which is also formed of duplicate metallic strips, and the bell-crank lever 3 may be disposed therebetween. The forward end of the cutting and/or gripping lever 2 is preferably open at both edges as at 15, 16 to allow of the operation of the bell-crank lever. The movement of the bell-crank lever may be limited by stops 8' and 17 provided at the forward end of the levers 2 and 1 which stops form, in the construction shown, the pivotal connections of the link 4 to the levers 1, 2.

A further modified form of piercing device is shown in Fig. 10. In this construction the arm of the bell-crank lever is as before provided with two projecting members 29, 30 but the pointed member disposed between these two prongs is bent first downwardly from the plane of the arm and thereafter in an upward direction.

If so desired the piercing device may be provided as a removable attachment to the cutting device. In such form the piercing device is shown in perspective in Fig. 11 and the position of its attachment to the cutting device is shown in dotted lines in Fig. 5. When this form of piercing device is used the formation of piercing device 22, 23, 24 and 25 at the end of the bell-crank lever 3 in Fig. 5 is omitted. This piercing device, shown in Fig. 11, comprises a flat piece of metal 40 having an arcuate recess 41, a piercing pin 42, and a fulcrum point 43. It should be noted that the formation, contour, or shape of this arcuate recess and also the distance between the points 42 and 43 are such that the point 43 acts as a fulcrum point whilst the point 42 acts as a piercing point, so that in the action of piercing, the plate 40 is swung as on a pivot on the point 43 whilst the point 42 pierces the metal of the lid of the tin or the body thereof and severs the metal in a direction towards the point 43. The plate 40 may be retained in position on the lever 1 by the rivets 44, 45 which are adapted to pass through the holes 46, 47 in the piercing plate.

A device such as hereinbefore described, when made of doubled-over metal or of interconnected strips and intended for cutting purposes, effects cutting of the tin and like container in such manner that the cut edge spreads or is forced outwardly by the cutting action thereby preventing tin and other particles of the cut metal falling into the container.

What we claim is:—

1. A hand operated device, comprising two operating levers, a link pivotally connecting said levers to cause their operative ends to move apart, and an angle formed link pivotally connected to the operative end of one of the levers and pivotally connected to the other lever remote from the operative end, said angle link having a part to cooperate with the forward portion of one of the levers.

2. A hand operated device, comprising two operating levers, a straight link connecting said levers remote from their operative ends, an angle link pivotally connected to the operative end of one of the levers and pivotally connected to the other of said levers remote from the operative end, said angle link having a portion thereof formed to provide a cutting edge for cooperation with one of the levers.

3. A hand operated device, comprising two operating levers, a fulcrum link connecting the levers remote from their ends, and an angle link connected to one of the levers in advance of the fulcrum as a leverage point and connected to the other of said levers in rear of the fulcrum to provide a fulcrum for said angle lever, that portion of the angle lever in advance of its fulcrum cooperating with one of the levers in advance of the lever fulcrum for cutting purposes.

4. A hand operated device, comprising two operating levers, a link providing fulcrums for said levers remote from their operative ends, and a member fulcrumed on one of said levers and operated through connection with the maximum leverage point of the other of said levers, said member being formed in part for cutting cooperation with one of the levers.

5. A hand operated device, comprising two independent operating levers, a link connecting said levers rearwardly of their forward ends, a second link connected to the forward end of one of said levers and connected to the second lever rearwardly of the connection of the first mentioned link thereto, said second lever having a portion adapted to cooperate with one of the levers when the free ends of the levers are moved toward each other.

6. A hand operated device, comprising two operating levers, a straight link having adjustable pivotal connection with the levers rearwardly of the forward ends thereof, a bell crank link having adjustable pivotal connection with the levers and crossing the first mentioned link, a portion of said bell crank link serving for operative cooperation with one of the levers when said levers are operated.

7. In a hand-operated cutting or gripping device, the combination of a pair of operating levers, two links pivotally interconnecting said levers, said links being angularly disposed relative to each other, each link being pivotally connected with each operating lever, one of said links being connected to the free end of one of said levers and provided with an offset portion adapted to cooperate with the other operating lever to receive the work between them.

8. In a hand-operating cutting or gripping device, the combination of a pair of operating levers, two links pivotally interconnecting said levers, said links being angularly disposed relative to each other, each link being pivotally connected with each operating lever, one of said links being connected to the free end of one of said levers and provided with an offset portion having a cutting edge adapted to cooperate with the other operating lever to receive the work between them to effect cutting.

9. In a hand-operating cutting or gripping device, the combination of a pair of operating levers, two links pivotally interconnecting said levers, said links being angularly disposed relative to each other, each link being pivotally connected with each operating lever, one of said links being connected to the free end of one of said levers and provided with an offset portion having a cutting edge adapted to cooperate with the other operating lever to receive the work between them to effect cutting, the arrangement and interconnection of the parts being such that the operating levers diverge at the cutting end of the device when the device is operated to effect cutting.

10. In a hand-operated cutting or gripping device, the combination of a pair of operating levers, an offset link pivotally connected with one of said levers, the said offset link being formed as a bell crank lever having a cutting edge adjacent the other operating lever and pivotally connected adjacent its apex to the said operating lever, a second link pivotally connected with said last mentioned lever forward of the apex of the bell crank lever and pivotally connected to the lever at any suitable point thereof.

11. In a hand-operated cutting or gripping device, the combination of two operating levers, two links pivotally interconnecting said levers, each link having pivotal connection with each operating lever and one of the links forming an offset bell crank lever pivotally connected to one of the operating levers, the operating lever adjacent the cutting edge of the bell crank lever being pivotally interconnected to the operating lever carrying the bell crank lever so that when the device is operated the two operating levers diverge at the work engaging end from each other while the cutting edges of the offset link and the adjacent lever converge to effect cutting or gripping, and spring means for returning the operating levers to inoperative position.

12. A hand-operated cutting or gripping device constructed as set forth in claim 1 in which each operating lever is formed of duplicate metallic strips suitably connected with one another.

13. A hand-operated cutting or gripping device in accordance with claim 3, wherein the offset portion which is formed as a bell crank lever is provided with holes for adjustment.

14. A hand-operated cutting or gripping device constructed as set forth in claim 1 in which one of said operating levers is provided with a plurality of holes for adjustment.

15. A hand-operated cutting or gripping device constructed as set forth in claim 1 in which one of said links is provided with a plurality of holes for adjustment.

16. A hand-operated cutting or gripping device constructed as set forth in claim 1 in which one of said operating levers and one of said links are provided with a plurality of holes for adjustment.

In testimony whereof we have hereunto signed our names.

ALBERT HENRY FRANKS PERL.
RICHARD HEMMINGS CARTER.